United States Patent

[11] 3,624,451

[72] Inventor Godfrey R. Gauld
Richmond, Ind.
[21] Appl. No. 34,239
[22] Filed May 4, 1970
[45] Patented Nov. 30, 1971
[73] Assignee Avco Corporation
Richmond, Ind.

[54] EFFICIENT LOW VOLTAGE PIEZOELECTRIC POWER SUPPLY

2 Claims, 4 Drawing Figs.

[52] U.S. Cl. .......... 317/80, 102/70.2 A, 317/81, 317/DIG. 11
[51] Int. Cl. .......... F23g 7/02
[50] Field of Search .......... 317/79, 80, 81, 96, 98; 102/70.2 A, 70.2 R

[56] References Cited

UNITED STATES PATENTS

| | | | |
|---|---|---|---|
| 3,288,068 | 11/1966 | Jefferson et al. | 102/70.2 A |
| 3,106,161 | 10/1963 | Wallbaum et al. | 102/70.2 A |
| 2,623,921 | 12/1952 | Smits | 317/79 |
| 3,337,758 | 8/1967 | Brothers | 102/70.2 R X |
| 3,363,566 | 1/1968 | Giattino et al. | 102/70.2 A |
| 3,438,326 | 4/1969 | Thomanek et al. | 317/80 X |

*Primary Examiner*—Volodymyr Y. Mayewsky
*Attorney*—Charles M. Hogan

ABSTRACT: An electric device for efficient transfer of power from a piezoelectric crystal source to a capacitor. The piezoelectric crystal is coupled to a transformer, the secondary of which is shunted by a series combination of a rectifying device and a storage capacitor, all in such manner that energy is transferred from the piezoelectric crystal, essentially a first capacitance device, to the storage capacitor, a second capacitance device, with a new order of efficiency. In a specific embodiment of the invention the piezoelectric crystal and two capacitances are associated with biasing networks and a transistorized switching circuit and a firing circuit in such manner that the energy transferred into the storage capacitor is utilized to fire a squib.

INVENTOR.
GODFREY R. GAULD
BY Charles M. Hogan
ATTORNEY

EFFICIENT LOW VOLTAGE PIEZOELECTRIC POWER SUPPLY

BACKGROUND OF THE INVENTION AND OBJECTS

If it be supposed, for purposes of discussion, that a charged capacitor is directly connected to another capacitance of the same size, then the first mentioned capacitance will discharge into the second until an equilibrium voltage condition is reached. The partial transfer of energy from one capacitance to the other is accompanied by a very substantial loss of energy because, while the capacitance of the supposititious system is doubled, the total energy remaining in the system after the transfer is a function of the voltage across the system, which voltage will be reduced by a factor of two. This hypothetical transfer of energy is accompanied by a substantial surge current and is a very lossy process. It is an object of the invention to provide a novel circuit arrangement for efficiently transferring power from one capacitance to another.

More specifically, a primary object of the invention is to provide efficient means for transferring power from a piezoelectric crystal to a storage capacitor.

A more specific object of the invention, as employed in a particular application, is to convert the energy of a mechanical impulse efficiently into electrical energy which is stored at low voltage. The stored energy may be used in ordnance fusing. For example, in firing bombs, rockets and shell fuses.

For a better understanding of the invention, together with other and further objects, advantages and capabilities thereof, reference is made to the drawings hereto appended.

A BRIEF DESCRIPTION OF THE DRAWINGS

DETAILED DESCRIPTION OF THE INVENTION

It has been theorized that the poor efficiency consequent upon the direct transfer of energy from one capacitor to another is due at least in part to resistance and radiation losses.

Figure 1:
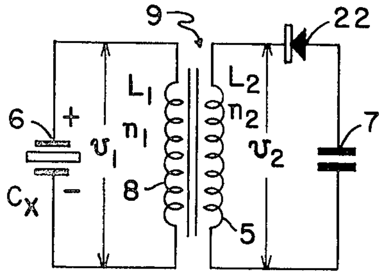
FIG. 1 is a circuit schematic of an energy transfer circuit in accordance with the invention.

The piezoelectric crystal 6 of FIG. 1 (also referred to as $C_x$) partakes of the nature of a capacitance, as is well known to those versed in the art. The basic problem solved by the present invention is the efficient transfer of electrical energy from the crystal 6 to a storage capacitor 7. This discussion will assume that the piezoelectric device 6 has been compressed by mechanical forces, such as those existing during setback of a missile, that the distorting forces upon the crystal are maintained, and that the crystal, therefore, is in a charged state. Distortion of the crystal is assumed to take place in a time which is short as compared to the natural period of the circuit including the primary 8 of transformer 9. It is further assumed that the distortion persists for a time which is long compared to the period of the primary circuit.

In other words, the crystal 6 takes on a charge rapidly, as it is compressed or distorted, but it discharges relatively slowly.

In accordance with the invention, a transformer 9 having a primary 8 and a secondary 5 is interposed between the piezoelectric crystal 6 and the transferree storage capacitor 7. A diode rectifying device 22 is interposed between the capacitor 7 and the secondary 9.

In the FIG. 1 circuit the transformer is employed as an intermediate storage device in the transfer of electrical energy from the distorted piezoelectric crystal to the capacitor. Mention has been made that the prior art energy transfer process involved losses due to radiation and heat. In accordance with the present invention, the electric energy taken out of the piezoelectric crystal is first captured in the magnetic field and then transferred to the electrostatic field of the transferee capacitor, with particularly high efficiency.

Another purpose of the transformer transfer is to reduce the voltage from the relatively high value available at the crystal terminals to a value sufficiently low for the operation of semiconductive active elements.

It has been found that energy transferred in accordance with the invention approaches an efficiency of 100 percent as compared to a theoretical maximum of 50 percent when the direct transfer process of the prior art is used between capacitors of equal value. The invention has a characteristic which is quite novel and not at all in conformity to the expectations of the prior art, in that the ratio of the initial voltage at the crystal to the final voltage at the storage capacitor is not functionally dependent on the turns ratio of the transformer 9 and is substantially independent thereof. Indeed, in the preferred embodiment of the invention, a step-up transformer is employed to achieve a low voltage.

Theoretical considerations are not requisite to a teaching of the invention to those of ordinary skill in the art, and the following explanation of operation is believed to be valid. Let it be assumed that crystal 6 discharges. There is no current in the secondary circuit during this initial discharge because current flow is blocked by the rectifier 22 and therefore there is no energy transfer to the storage capacitor 7 as the initial discharge occurs. Consequently, all of the energy initially stored in the crystal 6 will be transferred into the magnetic field of the transformer. The inductance of the primary causes the discharge to occur at a relatively low rate.

At the moment that the crystal 6 is completely discharged, the sense of the voltage across the secondary reverses so that the diode is now forwardly biased and conducts. The voltage across the storage capacitor 7 is then substantially equal to the voltage across the secondary and the voltage across the crystal is equated to the voltage across the primary. Since the quantum of energy stored in a capacitor is known to be equal to one-half of the product of the capacitance and the square of the voltage, it follows that the ratio of the energy stored in the crystal 6 ($W_1$) to that stored in the capacitor 7 ($W_2$) during the collapse of the magnetic field is expressed in this manner:

$$\frac{W_1}{W_2}=\frac{C_x n_1^2}{C_2 n_2^2}$$

As the magnetic field continues to collapse, the voltages rise until all of the energy has been transferred from the magnetic field of the transformer into the charge capacitances 6 and 7.

At the moment that the magnetic field in the transformer decreases to zero, both the primary and the secondary voltages attain maximum values. The diode 22 prevents the storage capacitor 7 from discharging as the secondary voltage drops off. Therefore, the energy transferred to the capacitor will be related to the initial energy stored on the crystal 6 by the expression:

$$\frac{W_2}{W_1+W_2}=\frac{1}{\frac{C_x n_1^2+C_2 n_2^2}{C_2 n_2^2}}=\frac{C_2 n_2^2}{C_x n_1^2+C_2 n_2^2}=e$$

This is the efficiency, $e$, of the transfer and it can be made to approach unity by making $n$ small as compared to $n_2$. The capacitance of the capacitor 7 is large compared to the capacitance of the crystal 6 because of the desired voltage reduction.

From the foregoing it will be seen that the operation of the invention is such that mechanical energy is first converted into electrical energy and stored in the crystal 6. As the crystal discharges its energy is stored in the magnetic field of the transformer, which then collapses so that the energy is ultimately efficiently transferred in the storage capacitor 7 and is available at low voltage.

The validity of the theoretical considerations set forth above has been confirmed empirically. On one operating embodiment of the invention a crystal was simulated by an 0.05 microfarad capacitor. The storage capacitor 7 had a value of 0.5 microfarads. The transformer had a turns ratio of one to five. The capacitor, which simulated the crystal, was charged to a value of 20 volts and then connected to the primary of the transformer 9. The particular circuit parameters here involved indicated a theoretical energy-transfer efficiency of 0.996. The actual efficiency was found to be 0.62, substantially greater than the theoretical maximum value permitted by the prior art process described above. The particular parameters there involved indicated a theoretical ratio of one to 250 between the residual energy in the crystal and that transferred to the storage capacitor. The actual measured ratio was one to 244.

Figure 2:
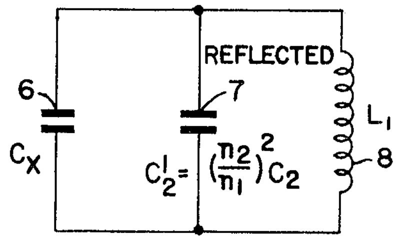
FIG. 2 is an equivalent diagram used as an aid in explaining the operation of the invention.

Another theoretical approach is shown in FIG. 2. FIG. 2 shows the circuit elements $C_x$ of the primary and the equivalent of the storage capacitor as reflected into the primary. The voltages across the two capacitances in FIG. 2 being the same, the ratio of the energy in the crystal to that in the equivalent of the storage capacitor, as reflected into the primary, is equal to the ratio of the two capacitances.

Now making references to the specific parameters discussed above, the storage capacitor 7 looks like 12.5 microfarads as reflected into the primary. The ratio of 12.5 to 0.05 is 250. Again, the theoretical ratio of the energy left in the crystal 6 to the energy deposited in the capacitor 7, when the analysis is made from the primary point of view, is 250. It was confirmed experimentally to be 244.

Figure 3:
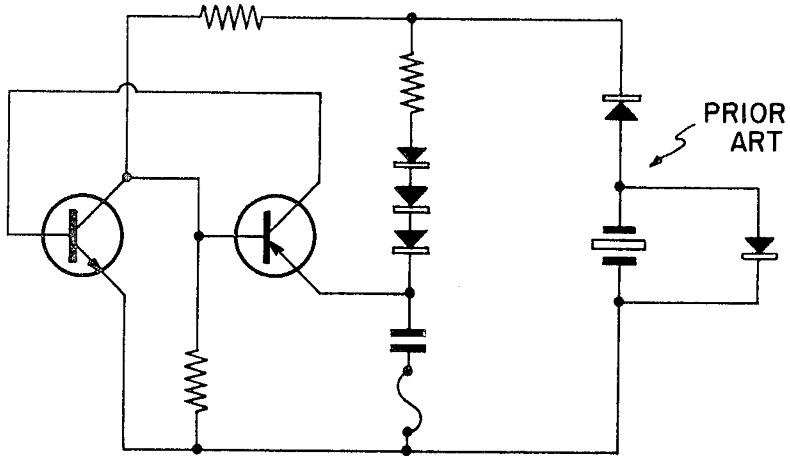
FIG. 3 is a circuit schematic of a piezoelectric delayed squib initiator in accordance with the prior art.

Reference is now made to FIG. 3. This is a prior art figure identical to that shown in the U.S. Pat. to G. R. Gauld, No. 3,340,811, issued Sept. 12, 1967, and entitled "Piezoelectric Delayed Squib Initiator."

Reference is made to that patent for a specific description of its construction and operation. Suffice it for the present to say that energy is transferred from its piezoelectric crystal power source to a storage capacitor and there utilized for purposes of firing a squib. The energy transfer is at relatively low efficiency. The invention provides significant advantages in this regard, and a specific embodiment thereof is accordingly incorporated in a piezoelectric power timer in accordance with FIG. 4 and now described in detail.

Figure 4:
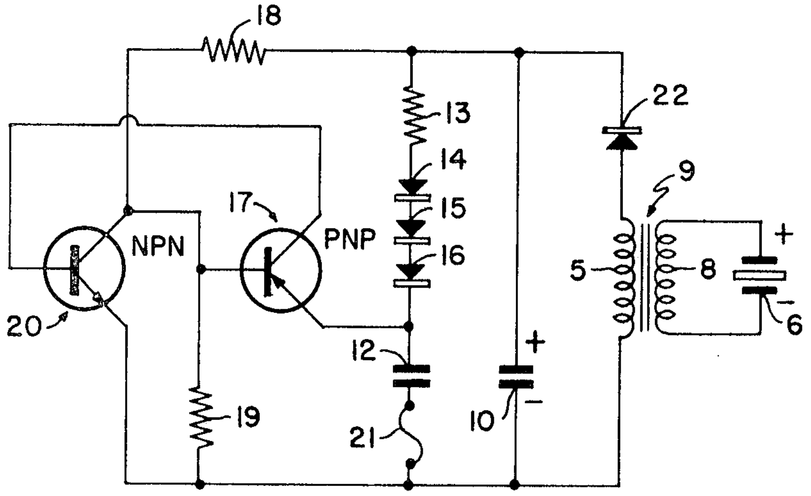
FIG. 4 is a circuit schematic of an improved squib initiator, incorporating an energy transfer device in accordance with the invention and, therefore, operating at a new order of efficiency.

All power in the FIG. 4 circuit is derived from a crystal 6. Let it be assumed that the crystal is installed in a missile which is fired, so that the crystal is compressed by setback forces. When the crystal is compressed, it assumes a charge with the positive polarity indicated. The crystal 6 is coupled, via transformer 9, to a timing capacitor 10, in series with a diode 22 across the secondary 5. A function of the FIG. 4 circuit is to cause the firing of a squib 21, which is in series with storage capacitor 12 between the emitters of transistors 17 and 20. An NPN-type transistor 20 and PNP-type transistor 17 comprise an electronic switch so arranged that when the positive potential on the emitter of transistor 17 overcomes the effect of the reverse potential on its base, the switch becomes conductive so that the capacitor 12 discharges through the circuit comprising squib 21, the base emitter circuit of transistor 17 and the base emitter circuit of transistor 20.

Referring again to the switch, transistors 17 and 20 are regeneratively connected, with the collector of each connected to the base of the other. The emitter base circuits of these two transistors provide a high current discharge path for storage capacitor 12. Timing capacitor 10 is coupled to this switch in such a way that, when capacitor 10 is fully positively charged, with the positive polarity indicated, the switching means is reversed bias into nonconductivity. The biasing network comprises a voltage divider consisting of series transistors 18 and 19, having their junction connected to the base of transistor 17 and the collector of transistor 20. This biasing network maintains the voltage at the base of transistor 17 positive relative to the voltage at its emitter when capacitor 10 is fully positively charged.

The second biasing network associated with these transistors comprises a chain consisting of resistor 13, diodes 14, 15 and 16, capacitor 12 and squib 21. This second biasing network operates in such a way that as capacitor 12 takes on charge, it biases the emitter on transistor 17 in the conductive direction and finally switches on the switch.

Particular attention is invited to the piezoelectric crystal 6 which is so arranged that it is left in the charged state until distortive effects are removed from the crystal. That is to say, a mechanical effect occurs and upon its cessation the crystal is left in a compressed or charged condition. After a desired delay interval, the squib 21 is fired as the switch becomes conductive.

In the prior art circuit of U.S. Pat. No. 3,340,811, the crystal, after being left in a charged state, discharges through the diodes 14, 15 and 16 into the storage capacitor 12, resulting in the discharge of capacitor 12 through the squib and switch. The energy discharged into the squib, upon firing, is that stored in the capacitor 12 and time delay involved in the interval between removal of the mechanical effect and firing is proportional to the capacitance of the crystal.

It will be noted that the crystal is a limiting factor, in the prior art circuit, both with respect to efficiency and the amount of time delay which can be achieved.

In accordance with the present invention, the timing function performed in the prior art circuit by the capacitance of the crystal is now performed by the capacitor 10. When the above-mentioned mechanical effect occurs, transfer of energy from the crystal to the capacitors 12 and 10 is accomplished with a new order of efficiency. For that reason more energy can be discharged into the squib and firing more effectively accomplished.

In the circuit in accordance with the invention, the theoretical efficiency can be made to approach 100 percent. In a specific successfully operable embodiment a 62 percent efficiency was measured. The significance of this is that while the prior art circuit delivers 500 ergs to the squib the improved circuit, with comparable parameters, makes available more than 3100 ergs. As an alternative to an increase in energy delivered to the squib, the time delay can be increased. Assume that a circuit in accordance with the present invention is designed to deliver 500 ergs to capacitor 12, and to have a long timing period. Since the time delay is approximately proportional to the capacitance of the timing capacitor 10, that capacitor can be made sufficiently large to increase the timing period up to about 140 seconds, as compared to 2.5 seconds in the prior art version. Thus it will be seen that the invention accomplishes not only a new order of efficiency in energy transfer, but it achieves considerable independence of the piezoelectric crystal as a time factor.

I claim:

1. In an energy generating and transfer circuit of the type comprising

- a piezoelectric signal generator having an output, a circuit for improved energy transfer comprising
- a transformer having a primary coupled to said output, and also a secondary,
- a rectifier device connected to form a series combination with said secondary,
- storage capacitance connected across said series combination,
- said energy being stored in the magnetic field of said transformer during transfer from said generator to said storage capacitance,
- a firing squib, and means energized by said capacitance to fire said squib.

2. A firing circuit comprising, in combination:

- transistorized electronic switching means adapted to be forward biased into conductivity and reverse biased into nonconductivity;

a piezoelectric generator adapted to be charged to provide a voltage of predetermined polarity, such generator having an output, a transformer having a primary coupled to said output and also a secondary, a unidirectional current-flow device in series combination with said secondary;

a first biasing circuit including a timing capacitor across said series combination for intercoupling said series combination and the switching means in such manner that, when the generator is charged, the switching means is reverse biased into nonconductivity;

a second biasing circuit, comprising a chain of diodes and a storage capacitor for intercoupling said series combination and the switching means in such a way that, as the generator discharges, the storage capacitor is charged by the generator to forward bias the switching means in a conductive direction, the switching means becoming conductive when the charge on the generator drops so low that the forward bias overcomes the reverse bias; and a firing squib, the storage capacitor and the firing squib being connected in a discharge path with the switching means, so that the storage capacitor discharges to fire the squib as the switching means becomes conductive.

* * * * *